(12) United States Patent
Suese

(10) Patent No.: US 8,526,840 B2
(45) Date of Patent: Sep. 3, 2013

(54) OPERATING DEVICE AND IMAGE FORMING APPARATUS

(75) Inventor: Narihiko Suese, Osaka (JP)

(73) Assignee: Kyocera Mita Corporation (JP)

( * ) Notice: Subject to any disclaimer, the term of this patent is extended or adjusted under 35 U.S.C. 154(b) by 284 days.

(21) Appl. No.: 13/014,329

(22) Filed: Jan. 26, 2011

(65) Prior Publication Data
US 2011/0188877 A1 Aug. 4, 2011

(30) Foreign Application Priority Data
Feb. 4, 2010 (JP) .................. 2010-022883

(51) Int. Cl.
*G03G 15/00* (2006.01)
(52) U.S. Cl.
USPC ........................................... 399/81; 399/392
(58) Field of Classification Search
USPC ........................................ 399/81, 391, 392
See application file for complete search history.

(56) References Cited

U.S. PATENT DOCUMENTS

| 6,876,824 B2 * | 4/2005 | Maeda ............................. 399/82 |
| 2002/0051161 A1 | 5/2002 | Kanazawa et al. |
| 2006/0092450 A1 | 5/2006 | Kanazawa et al. |

FOREIGN PATENT DOCUMENTS

| JP | 4-155354 | 5/1992 |
| JP | 5-162871 | 6/1993 |
| JP | 2004112626 | 4/2004 |
| JP | 200725460 | 2/2006 |

* cited by examiner

*Primary Examiner* — David Gray
*Assistant Examiner* — Erika J Villaluna
(74) *Attorney, Agent, or Firm* — Gerald E. Hespos; Michael J. Porco; Matthew T. Hespos

(57) ABSTRACT

When a manual feed tray detector detects that a manual feed tray has been set to a feeding position before any one of workflow images displayed on a workflow screen is pressed by a user, a display controller causes a sheet storage location reception screen to be displayed in an interrupting manner between respective reception screens.

4 Claims, 7 Drawing Sheets

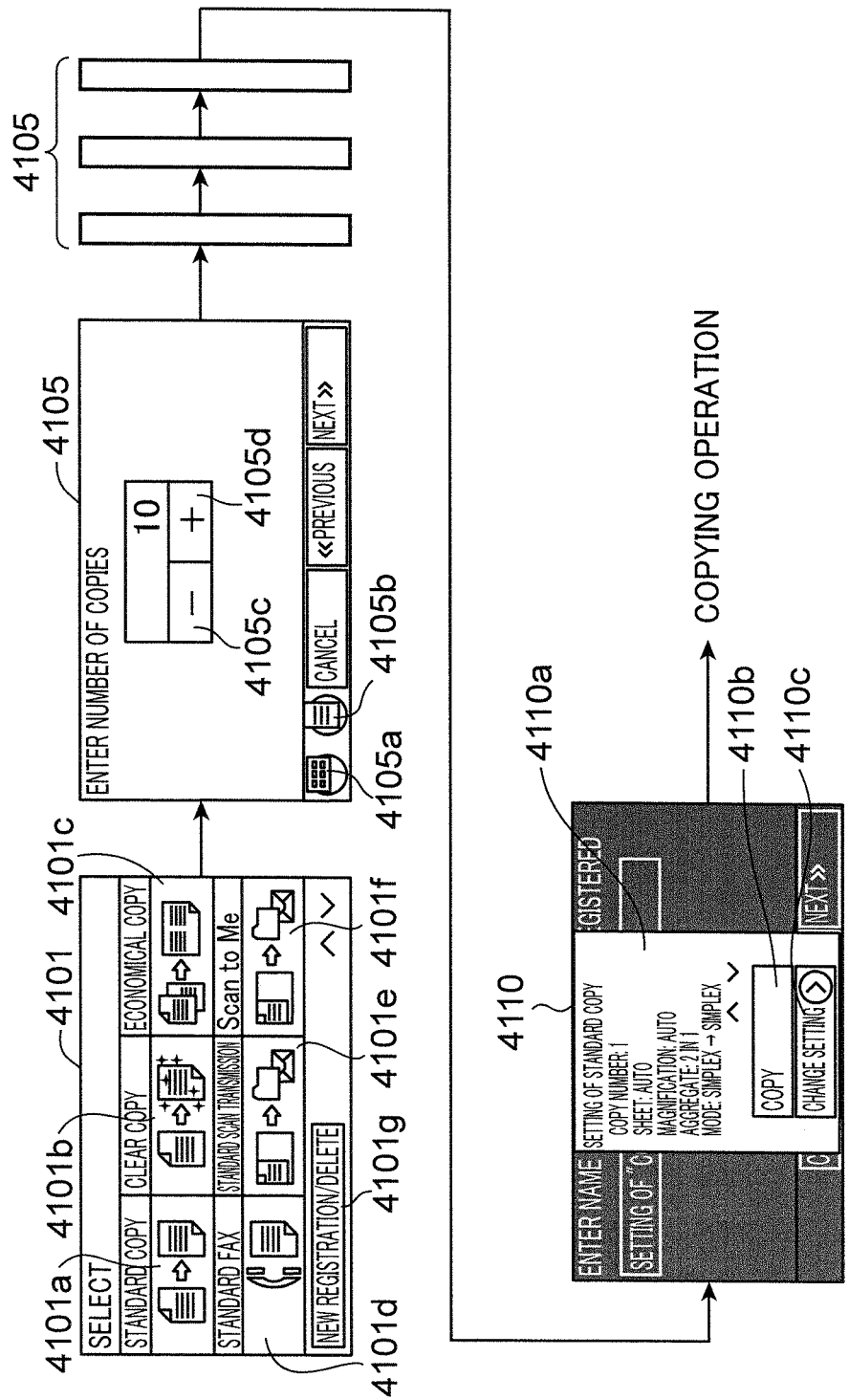

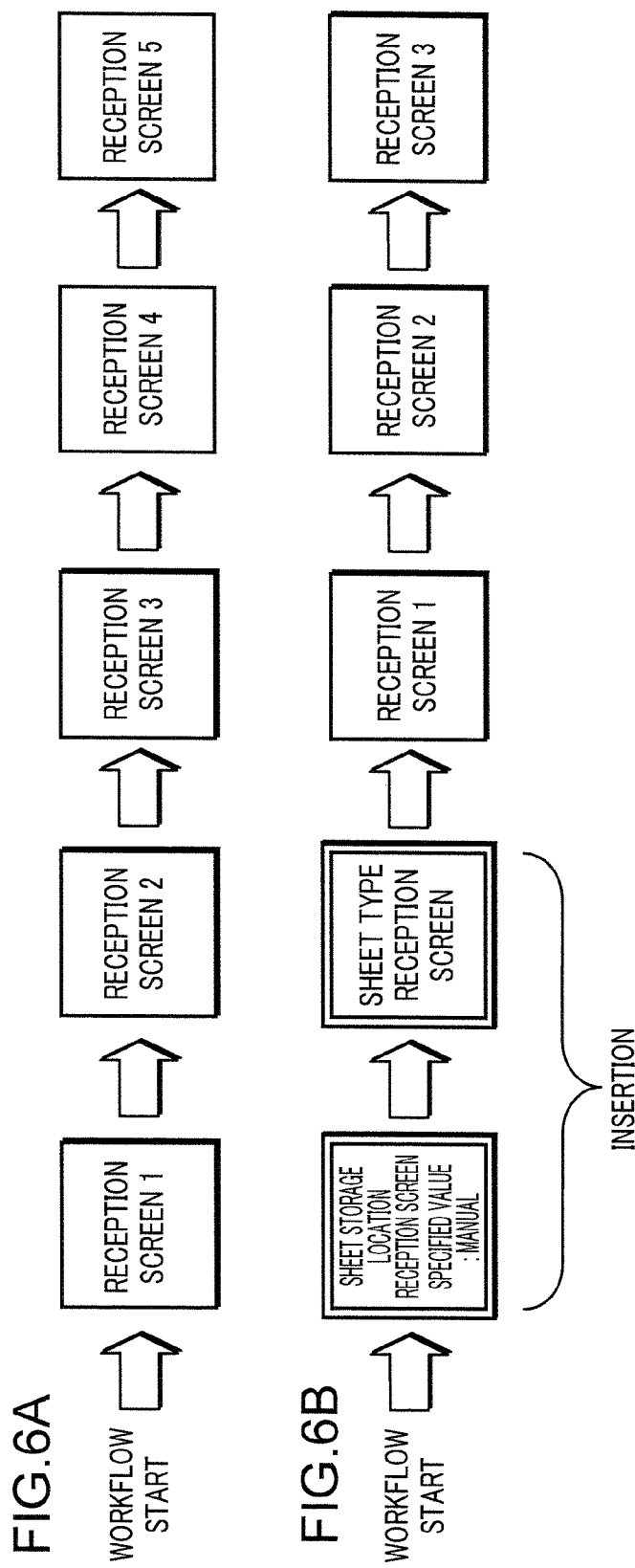

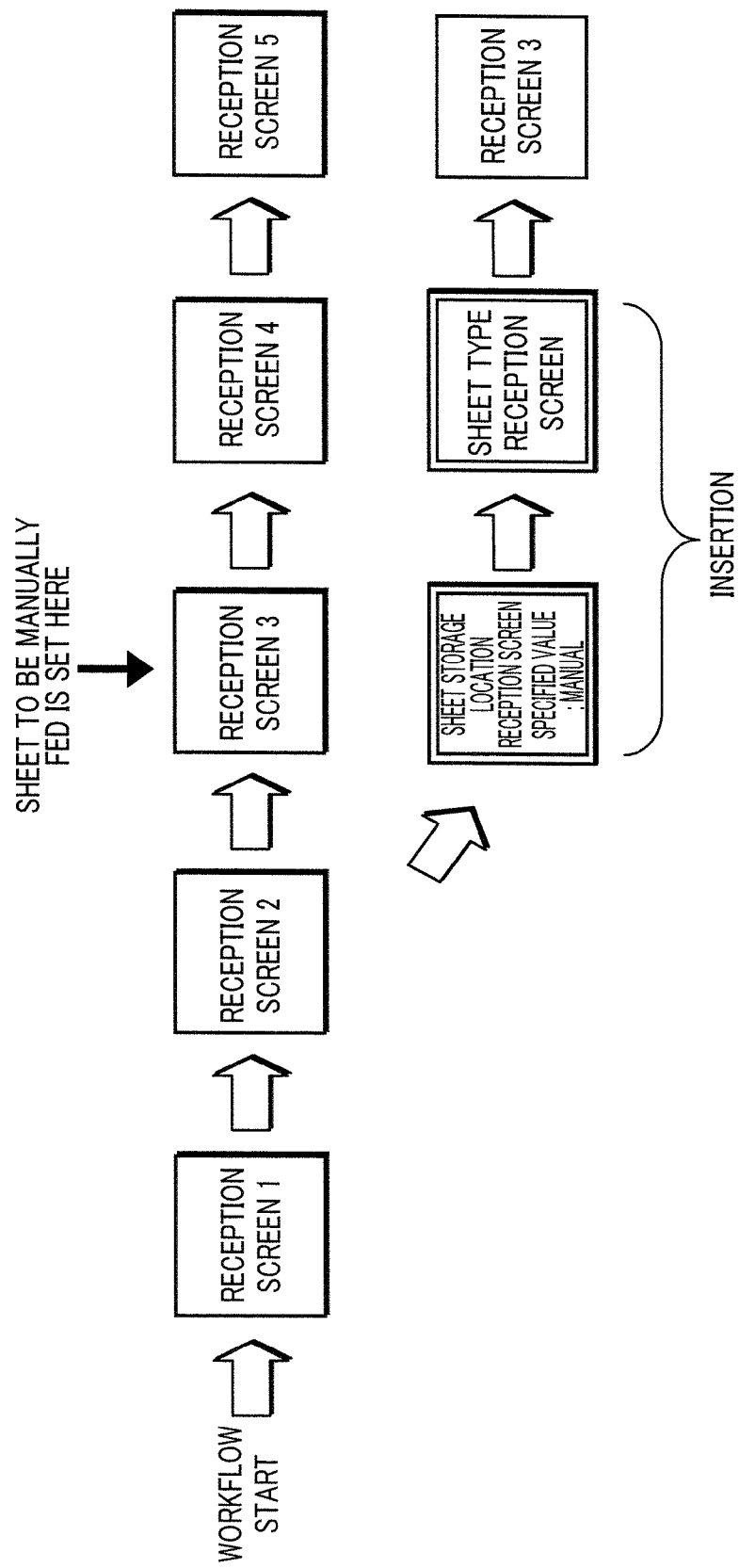

OPERATING DEVICE AND IMAGE FORMING APPARATUS

BACKGROUND OF THE INVENTION

1. Field of the Invention

The present invention relates to a technological field of an operating device provided in a copier, a facsimile machine, a printer, a complex machine having these functions or the like and an image forming apparatus including this operating device.

2. Description of the Related Art

An image forming apparatus such as a copier, a facsimile machine, a printer or a complex machine having these functions normally includes a manual feed tray mainly used to feed sheets of sizes with low use frequencies and special sheets such as postcards for an image forming operation of an image forming unit in addition to main sheet cassette(s) provided in an apparatus main body.

There has been conventionally known a technology on a process of the apparatus when the manual feed tray is attached to the apparatus main body. Specifically, switching of a copy mode depending on the presence or absence of a sheet on the manual feed tray and automatic selection of the manual feed tray as a sheet supply source when a sheet is placed on the manual feed tray are known.

There is also known a technology for executing the following control in an image forming apparatus. Specifically, a control circuit discriminates to which of an automatic feed mode and a manual feed mode a sheet feed mode is to be set based on an output signal of a sheet detector. If the sheet detector detects that a sheet is set on the manual feed tray, the manual feed mode is set by the control circuit. Then, a message saying "Manual feed mode is set. Test printing?" is displayed on an LCD device.

On the other hand, some of electric apparatuses of recent years such as image forming apparatuses are known to display function setting screens (reception screens) in a wizard format (user interactive format) on a display unit to improve operability at the time of function execution by a user upon setting sheet size, magnification, density, aggregate print and document image quality applied during a copying operation.

SUMMARY OF THE INVENTION

The present invention is a further improvement of the above prior art.

Specifically, the present invention is directed to an operating device, comprising: a display unit; a detector that detects either whether or not a manual feed tray capable of selectively storing sheets of a plurality of sizes, which can be fed to an image forming unit that forms an image on a sheet, has been set in a state capable of feeding a sheet or whether or not a sheet has been set on the manual feed tray; and a display controller that causes the display unit to display a plurality of reception screens used to enter set values for a plurality of processing items in an image forming apparatus including the operating device in a wizard format; wherein the display controller causes the display unit to display a sheet storage location reception screen used to enter a set value for a storage location of a sheet to be fed for an image forming operation by the image forming unit in an interrupting manner between the respective reception screens to be displayed in the wizard format and a message to the effect that the set value for the sheet storage location is already set to the manual feed tray on the sheet storage location reception screen when the detector detects that the manual feed tray has been in the state capable of feeding a sheet or a sheet has been set on the manual feed tray.

These and other objects, features and advantages of the present invention will become more apparent upon reading the following detailed description along with the accompanying drawings.

BRIEF DESCRIPTION OF THE DRAWINGS

FIG. 5 is a diagram showing a transition of display screens at the time of calling a workflow for the copy function.

FIGS. 6A and 6B are diagrams showing a display order of reception screens, a sheet storage location reception screen and a sheet type reception screen when a manual feed tray is set to a sheet feed position before a workflow is selected.

FIG. 7 is a diagram showing a display order of the respective reception screens, the sheet storage location reception screen and the sheet type reception screen when the manual feed tray is set to the sheet feed position while a reception screen relating to a certain workflow is displayed.

DETAILED DESCRIPTION OF THE PREFERRED EMBODIMENTS

Figure 1:
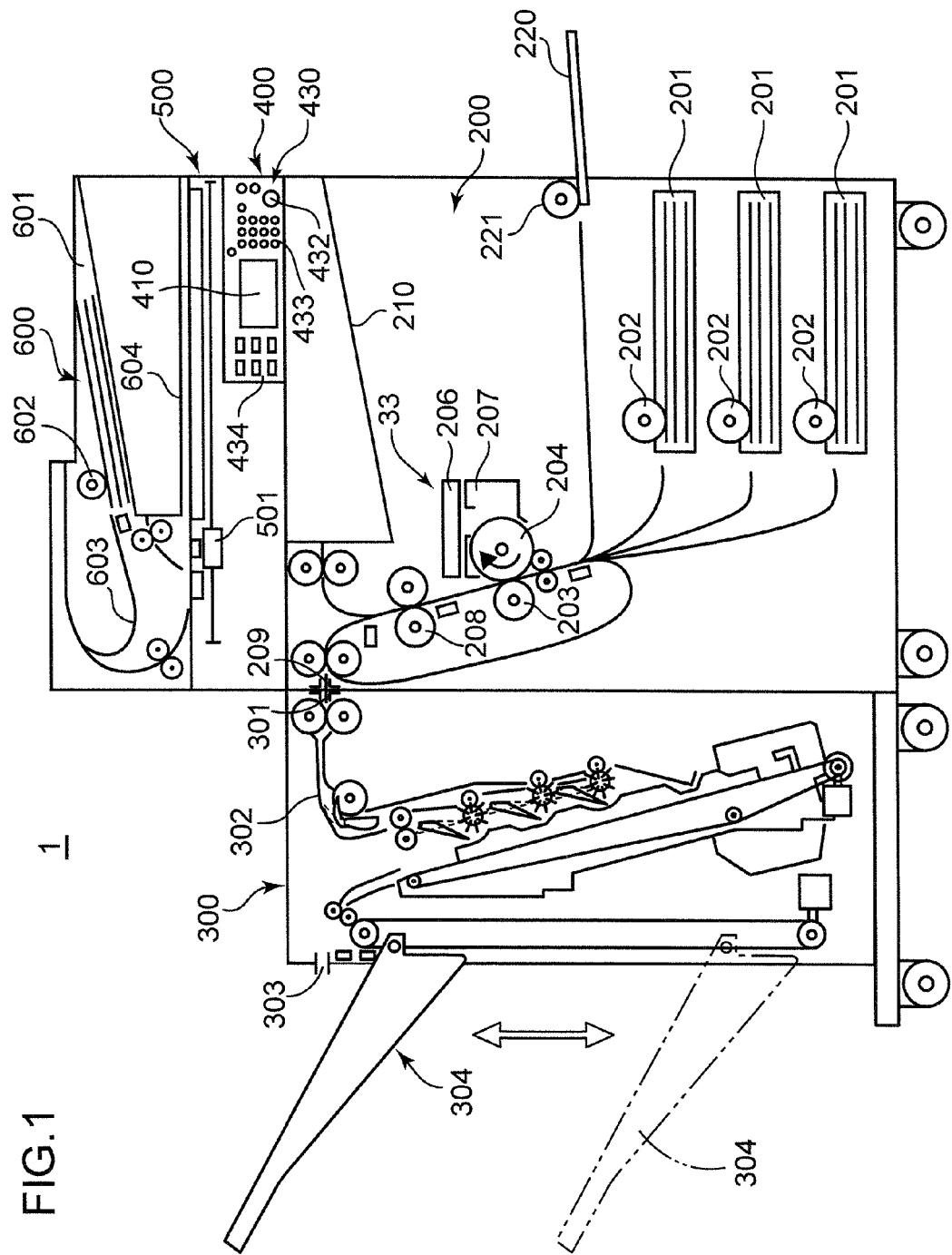
FIG. 1 is a schematic side view showing an exemplary construction of an image forming apparatus according to an embodiment of the invention.
Figure 2:
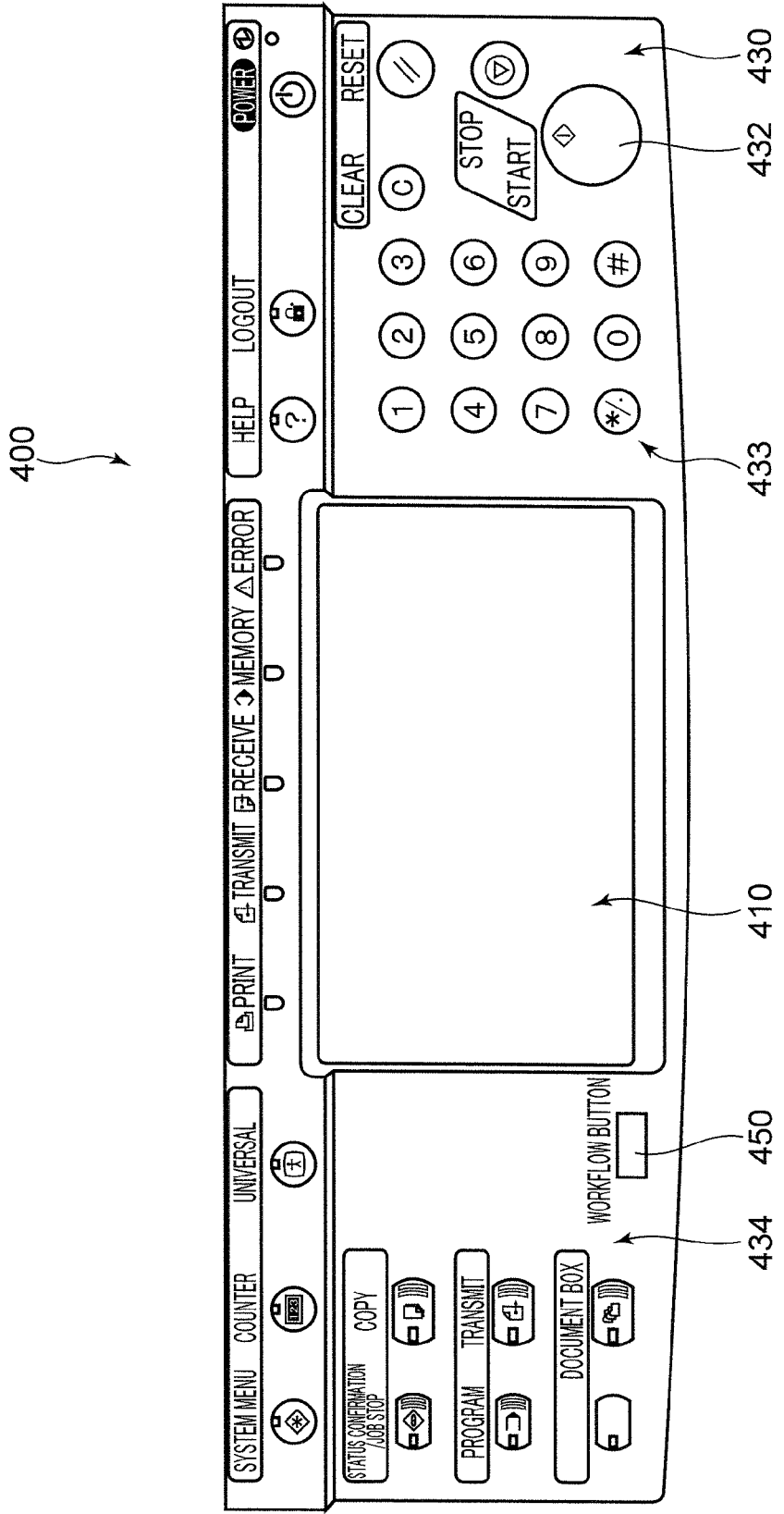
FIG. 2 is a partial enlarged view of an operation unit.

Hereinafter, an image forming apparatus according to the present invention is described. FIG. 1 is a schematic side view showing an exemplary construction of an image forming apparatus according to an embodiment of the invention. FIG. 2 is a partial enlarged view of an operation unit.

The image forming apparatus 1 shown in FIG. 1 is a complex machine having a scanner function, a facsimile function, a printer function, a copy function and other functions and provided with a main unit 200, a sheet post-processing unit 300 arranged on a sheet carry-out side, i.e. on the left side of the main unit 200, an operation unit 400 used by an operator to enter various operation instructions and the like, a document reading unit 500 arranged on the main unit 200 and a document feeding unit 600 arranged on the document reading unit 500.

As also shown in FIG. 2, the operation unit 400 includes a display unit 410 composed of an LCD (Liquid Crystal Display) and the like, and an operation key unit 430 used by an operator to enter operation instructions. The operation key unit 430 includes a start key 432, a numerical pad 433, function changeover keys 434 and the like.

The start key 432 receives instructions from the operator to start respective operations such as a copying operation and a scanning operation. The numerical pad 433 includes keys for receiving instructions designating the number of copies and the like from the operator. The function changeover keys 434 are keys for receiving instructions from the operator to switch the function among the scanner function, the facsimile function, the printer function and the copy function.

The display unit 410 includes a touch panel unit composed of the LCD (Liquid Crystal Display) and the like and having a touch panel function. The display unit 410 can display various reception screens and enables the operator to enter execution commands of various functions by touching a display surface (displayed operation keys).

Referring back to FIG. 1, the document feeding unit 600 includes a document placing portion 601, a feed roller 602, a document conveying unit 603 and a document discharging portion 604. The document reading unit 500 includes a scanner 501. The feed roller 602 feeds documents set on the document placing portion 601 one by one, and the document conveying unit 603 successively conveys the fed documents to a reading position of the scanner 501. The scanner 501 successively reads images of the documents being conveyed, and the documents having the images thereof read are discharged onto the document discharging portion 604.

The main unit 200 includes a plurality of sheet cassettes 201, a plurality of pickup rollers 202, an image forming unit 33, a discharge port 209, a discharge tray 210, etc. The image forming unit 33 includes a transfer roller 203, a photoconductive drum 204, an exposure device 206, a developing device 206 and a fixing roller 208.

The photoconductive drum 204 is uniformly charged by a charger (not shown) while being rotated in an arrow direction. The exposure device 206 scans a laser beam modulated in accordance with an image of a document read by the document reading unit 500 across a surface of the photoconductive drum 204 to form electrostatic latent images on this surface. The developing device 207 supplies black developer to the photoconductive drum 204 to form a toner image.

On the other hand, the pickup roller 202 picks up a print sheet from the sheet cassette 201 containing print sheets and feeds it to the transfer roller 203. The transfer roller 203 transfers the toner image formed on the surface of the photoconductive drum 204 to the conveyed print sheet, and the fixing roller 208 fixes the transferred toner image to the print sheet by applying heat. Thereafter, the print sheet is carried into the sheet post-processing unit 300 through the discharge port 209 of the main unit 200. Further, the print sheet may be discharged to the discharge tray 210 according to need.

A manual feed tray 220 is a tray provided at a specified position of a side surface of the image forming apparatus 1 and is pivotable about its bottom end as a pivot center between an accommodated position where it is in a substantially upright position parallel to the side surface and a feeding position where it is in an inclined posture to the side surface. Sheets are stacked on the upper surface of the manual feed tray 220 and fed toward the photoconductive drum 204 by a pickup roller 221 when the manual feed tray 220 is located at the feeding position.

The manual feed tray 220 is for selectively feed sheets of a plurality of sizes to the image forming unit 33 and mainly used to feed sheets of sizes with low use frequencies and special sheets such as postcards, which cannot be set in the sheet cassettes 201, for an image forming operation in the image forming unit 33.

The sheet post-processing unit 300 includes a carry-in port 301, a print sheet conveying unit 302, a carry-out port 303, a stack tray 304, etc. The print sheet conveying unit 302 successively conveys print sheets brought to the carry-in port 301 through the discharge port 209 and finally discharges the print sheets to the stack tray 304 through the carry-out port 303. The stack tray 304 is so constructed as to be vertically movable in arrow directions according to the number of print sheets carried out through the carry-out port 303.

Figure 3:
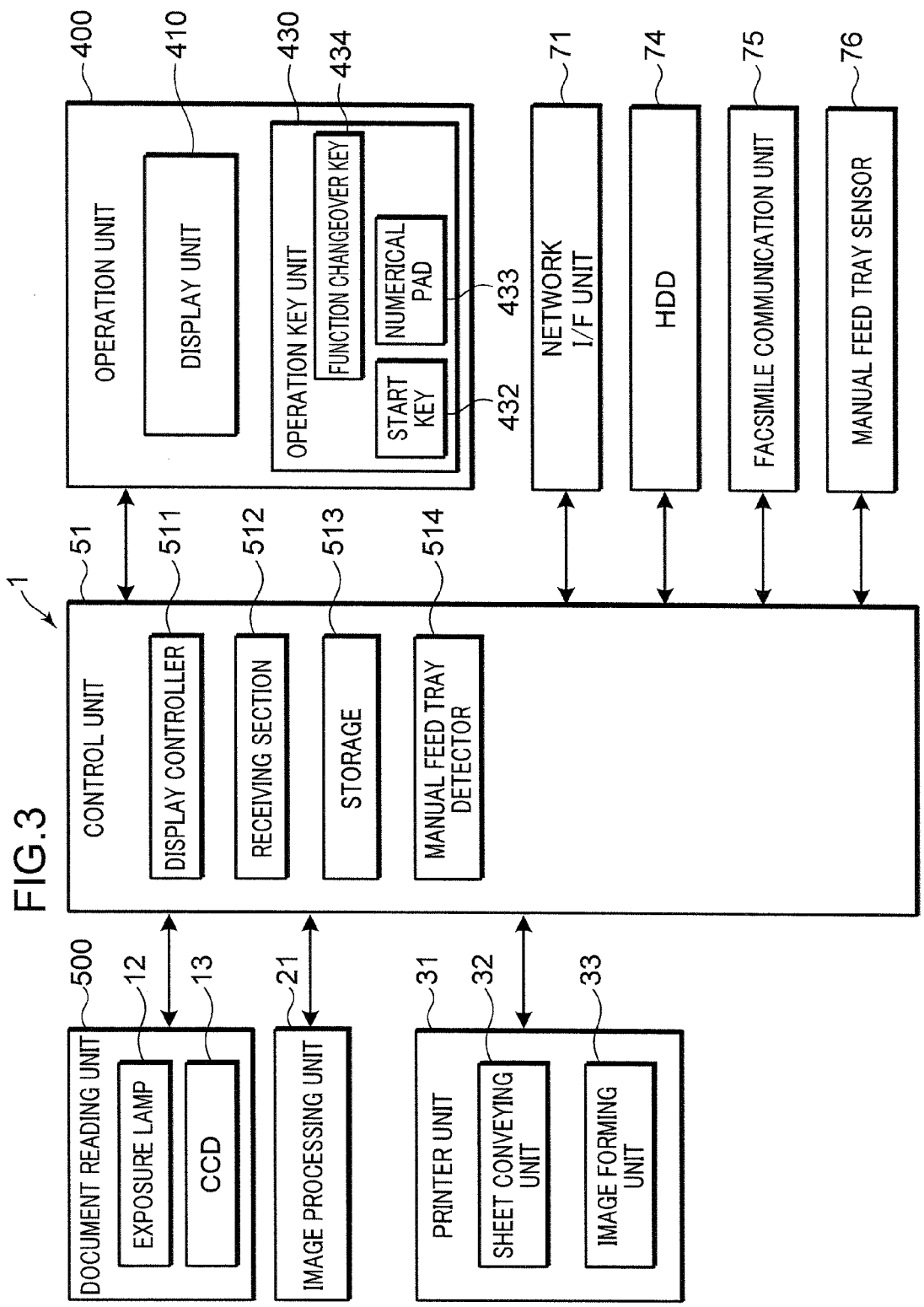
FIG. 3 is a block diagram showing an electrical construction of the image forming apparatus shown in FIG. 1.

FIG. 3 is a control block diagram of the image forming apparatus 1 shown in FIG. 1. As shown in FIG. 3, the image forming apparatus 1 is provided with the document reading unit 500, an image processing unit 21, a printer unit 31, the operation unit 400, a control unit 51, a network I/F (interface) unit 71, an HDD (Hard Disk Drive) 74 and a facsimile communication unit 75.

The document reading unit 500 includes an exposure lamp 12 and a CCD (Charge Coupled Device) 13 constituting the scanner 501 shown in FIG. 1. The document reading unit 500 irradiates a document by the exposure lamp 12 and receives reflected light by the CCD 13 to read an image from the document, and outputs an image corresponding to the read image to the image processing unit 21.

The image processing unit 21 applies various processings including specified correction processings such as a level correction and a $\gamma$ correction, image compression or expansion and size enlargement or reduction to a read image according to need. An image processed by the image processing unit 21 is stored in an illustrated image memory or output to the printer unit 31.

The printer unit 31 includes a sheet conveying unit 32 composed of the sheet cassettes 201 and the pickup rollers 202 shown in FIG. 1, an image forming unit 33 composed of the photoconductive drum 204, the exposure device 206, the developing device 207, the transfer roller 203, the fixing roller 208 and the like shown in FIG. 1. The printer unit 31 conveys a recording sheet to the image forming unit 33 by the sheet conveying unit 32, forms a toner image corresponding to an image on the photoconductive drum 204 based on document data read by the document reading unit 500 by the image forming unit 33, transfers the toner image formed on the photoconductive drum 204 to the recording sheet by the transfer roller 203 and fixes the toner image to the recording sheet by the fixing roller 208, whereby an image is formed.

The network I/F unit 71 controls transmission and reception of various data to and from external apparatuses via a LAN using a network interface (10/100 Base-TX) or the like. The HDD 74 stores images read by the document reading unit 500 and output formats and the like set for these images.

The operation unit 400 includes the display unit 410 and the operation key unit 430 as shown in FIGS. 1 and 2. The display unit 410 displays a plurality of keys that receive input of various instructions by the touch panel function under the control of the control unit 51. The operation key unit 430 includes the function changeover keys 434, the start key 432, the numerical pad 433, a workflow button 450 and the like shown in FIG. 2. The control unit 51 receives instructions input by the operator from the respective keys of the display unit 410 and the operation unit 400.

The workflow button 450 is a button that receives input of an instruction to start a workflow operation that executes the function such as the copying operation or the scanning operation with contents set beforehand by a user and an instruction to start a process of registering, changing or deleting the workflow operation.

The facsimile communication unit 75 includes an encoder/decoder (not shown), a modulator/demodulator (not shown) and an NCU (Network Control Unit: not shown)). The facsimile communication unit 75 transmits document image data read by the document reading unit 500 to a facsimile machine or the like via a telephone line and receives image data transmitted from a facsimile machine or the like. The encoder/decoder compresses and encodes image data to be transmitted and expands and decodes received image data. The modulator/demodulator modulates compressed and encoded image data into a sound signal and demodulates a received signal (sound signal) into image data. The NCU controls connection with facsimile machines and the like as transmission and reception destinations by the telephone line.

A manual feed tray sensor 76 detects whether or not the manual feed tray 220 is located at the feeding position. An unillustrated switch of the manual feed tray sensor 76 is on and a H (high) signal is output to the control unit 51 when the manual feed tray 220 is located at the feeding position, whereas this switch is off and an L (low) signal is output to the control unit 51 when the manual feed tray 220 is not located at the feeding position (located at the accommodated position).

The control unit 51 includes a CPU responsible for an operation control of the image forming apparatus 1, a RAM (Random Access Memory) having a function for temporarily storing data and a function as a work area, a ROM storing programs beforehand. The CPU reads the program or the like from the ROM and executing it. The CPU, RAM and ROM are so configured as to transmit and receive data via a data bus.

The control unit 51 has functions as a display controller 511, a receiving section 512 and a storage 513 by the execution of an image processing program specific to this embodiment and stored in the ROM or the like by the CPU.

The display controller 511 causes the display unit 410 to display reception screens (operation screens) used to set values for respect processing items in the image forming apparatus 1 in a wizard format.

The receiving section 512 receives input of set values when the set values are entered using the reception screens.

The storage 513 stores various data used to display operation guidance to an operator (particularly in this embodiment, the storage 513 stores display data used to cause the display unit 410 to display reception screens that receives input needed to be registered for the execution of the functions such as the copying operation and the scanning operation) and image data (including images, characters, symbols and the like) used to display operating conditions and the like of the respective functions such as the scanner function, facsimile function, printer function and copy function.

The storage 513 also stores a plurality of templates (standard forms) each composed of a combination of the respective processing items on the function executable in the image forming apparatus 1. The template is, for example, a combination of the processing items such as the number of copies, sheet size, magnification, density, aggregate print, document image quality and duplex/split applied in each function such as the copying operation.

Each template is used in a workflow performs a process of guiding a user for the respective inputs needed to be registered for the execution of the function such as the copying operation or in a workflow stores set contents (set values) of the respective processing items applied upon executing the function such as the copying operation and executing the function such as the copying operation with the respective set contents.

Figure 4:
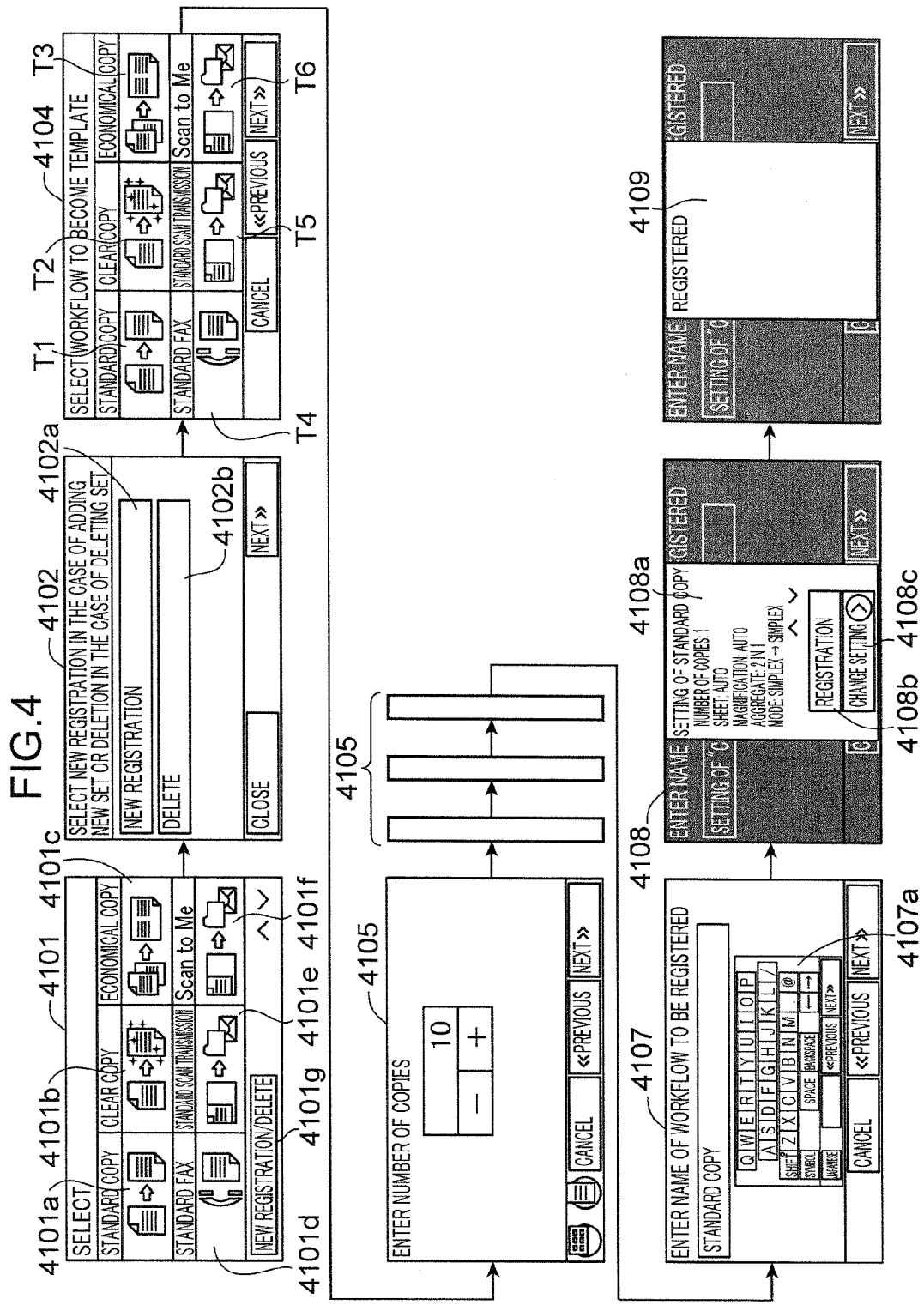
FIG. 4 is a diagram showing a transition of display screens on a display unit at the time of generating and registering a workflow for a copy function.

Next, a process of generating and registering a workflow in the image forming apparatus 1 is described. FIG. 4 is a diagram showing a transition of display screens on the display unit 410 at the time of generating and registering a workflow for the copy function.

As shown in FIG. 4, when a main power supply of the image forming apparatus 1 is turned on by a user and, for example, a copy button is depressed to start the copy function, the display controller 511 causes the display unit 410 to display an unillustrated initial screen.

When the workflow button 450 of the operation unit 400 is depressed by the user during the display of this initial screen and a workflow starting instruction is received by the receiving section 512, the display controller 511 causes a workflow screen 4101 (FIG. 4) to be displayed. This enables the start of an operation for generating and registering the workflow or deleting the workflow. The display controller 511 causes the workflow screen 4101 to display a new registration/deletion button 4101g for receiving new registration/deletion of the workflow from the user.

If the start key 432 and/or the numerical pad 433 and the like are depressed with set contents such as sheet selection and magnification designated by the user on the initial screen or with already set contents to input an instruction to execute the copying operation without the workflow button 450 being depressed by the user during the display of the initial screen (without the workflow starting instruction being received), a normal copying operation is executed in accordance with this depressing operation.

On the other hand, if the new registration/deletion button 4101g is pressed by the user during the display of the workflow screen 4101 by the display controller 511, the display controller 511 causes the display unit 410 to display a workflow registration/deletion screen 4102 (FIG. 4) prompting the user to instruct selection of either workflow new registration or workflow deletion.

A new registration button 4102a for receiving a workflow new registration instruction from the user and a deletion button 4102b for receiving a workflow deletion instruction from the user are displayed on the workflow registration/deletion screen 4102. A process and the like when the deletion button 4102b is pressed are not described.

When the new registration button 4102a is pressed during the display of the workflow registration/deletion screen 4102 and a workflow new registration instruction is received by the receiving section 512 by the touch panel function, the display controller 511 causes the display unit 410 to display a template selection screen 4104 (FIG. 4) prompting selection of the template used for workflow generation. Images T1 to T6 indicating the respective templates usable for workflow generation are displayed on this template selection screen 4104.

When any one of the images T1 to T6 indicating the templates is pressed during the display of this template selection screen 4104 and selection of the template for wizard format display used for workflow generation is received by the receiving section 512 by the touch panel function, the display controller 511 reads the selected template from the storage 513 and causes the display unit 410 to successively display reception screens 4105 for the respective settings of the function indicated by the read template (e.g. in the case of the copy function, number of copies, sheet size, magnification, density, aggregate print, document image quality, duplex/split, etc.) in the wizard format.

The display controller 511 displays the reception screens for all the settings of the function indicated by the template and repeats a reception screen displaying process and a set content receiving process until receiving designated contents on the respective reception screens. When the reception screen displaying process and the set content receiving process are completed for all the settings, the display controller 511 causes the display unit 410 to display an input screen 4107 for the name of this generated workflow. A keyboard image 4107a and the like are displayed on this input screen 4107, so that the user can press the keyboard image to enter the workflow name by the touch panel function.

When the workflow name is entered by the user through the operation of the input screen 4107, the display controller 511 causes the display unit 410 to display a confirmation screen 4108 including an image 4108a displaying a list of the processing items received on the above reception screens, a registration button 4108b for receiving an instruction to register with the list-displayed processing items, and a setting change button 4108*c* for receiving an instruction to change the contents of the list-displayed processing items.

When the registration button 4108*b* is pressed by the user during the display of this confirmation screen 4108 and an instruction to register with the respective list-displayed processing items is received by the receiving section 512, the control unit 51 causes the customized template to be stored in the storage 513. Note that, thereafter, the display controller 511 causes the display unit 410 to display a registration completion screen 4109 to notify registration completion to the user.

When the setting change button 4108*c* is pressed by the user during the display of the confirmation screen 4108 and a setting change instruction to change the list-displayed contents of the respective settings is received by the receiving section 512, the display controller 511 returns to the process of causing the display unit 410 to successively display the respective reception screens for the respective settings of the function indicated by the template whose selection was previously received (e.g. in the case of the copy function, number of copies, sheet size, magnification, density, aggregate print, document image quality, duplex/split, etc.).

Next, a process of calling a workflow in the image forming apparatus 1 is described. FIG. 5 is a diagram showing a transition of display screens at the time of calling a workflow for the copy function.

When the main power supply of the image forming apparatus 1 is turned on by a user, the display controller 511 causes the display unit 410 to display the unillustrated predetermined initial screen.

When the workflow button 450 of the operation unit 400 is depressed by the user during the display of this initial screen and a workflow starting instruction is received by the receiving section 512, the display controller 511 causes a workflow screen 4101 (FIG. 5) to be displayed. Workflow images 4101*a* to 4101*f* indicating respective workflows stored (registered) in the storage 513 are displayed on the workflow screen 4101.

When any one of the workflow images 4101*a* to 4101*f* displayed on the workflow screen 4101 is pressed by the user during the display of the workflow screen 4101 and a workflow selection instruction to select a workflow applied for the execution of the function (e.g. copying operation) of the image forming apparatus 1 is received from the user, the display controller 511 reads this selected workflow from the storage 513 and causes the display unit 410 to successively display reception screens (e.g. reception screens 4105 shown in FIG. 5) for the respective settings of the function indicated by the read template (e.g. in the case of the copy function, number of copies, sheet size, magnification, density, aggregate print, document image quality, duplex/split, etc.).

When content designation on the processing item (e.g. specific number of copies) guided on the reception screen is received by the touch panel function based on the operation of an operation button displayed on the reception screen or the numerical pad 433 or the like by the user, the set content is set to the designated content (set value).

The display controller 511 repeats the reception screen displaying process and the set content receiving process until the reception screens for all the processing items of the function indicated by the read template are displayed. When the set content receiving processes on the reception screens for the processing items relating to a document reading operation are completed, the control unit 51 causes the document reading unit 500 to start a document reading operation from that point of time.

Thereafter, when the reception screen displaying process and the set content receiving process are completed for all the processing items, the display unit 410 is caused to display a confirmation screen 4110 including an image listing the set contents received up to this point of time, a function execution button (4110*b* of FIG. 5) for receiving designation of function execution with the respective list-displayed set contents, and a button (setting change button 4110*c* of FIG. 5) for receiving an instruction to change the respective list-displayed set contents. When the function execution button 4110*b* is pressed and an instruction to execute the function with the respective list-displayed set contents is received by the receiving section 512, the control unit 51 executes the function (copying operation or the like) with the respective list-displayed set contents.

In addition to the above construction, in this embodiment, the respective reception screens 4105 are displayed as follows when the manual feed tray 220 is set to the feeding position.

Specifically, the control unit 51 of the image forming apparatus 1 according to this embodiment has a function as a manual feed tray detector 514 in addition to the respective constituent elements 511 to 513. The manual feed tray detector 514 is for detecting whether or not the manual feed tray 220 is set at the feeding position based on an output signal of the manual feed tray sensor 76. The manual feed tray detector 514 judges that the manual feed tray 220 is set at the feeding position when receiving an H (high) signal from the manual feed tray sensor 76 while judging that the manual feed tray 220 is not set at the feeding position when receiving an L (low) signal from the manual feed tray sensor 76.

When the manual feed tray detector 514 judges that the manual feed tray 220 is set to the feeding position before any one of the workflow images 4101*a* to 4101*f* displayed on the workflow screen 4101 is pressed by the user, the display controller 511 first causes the display unit 410 to display a sheet storage location reception screen used to enter a set value for a storage location of a sheet to be fed for an image forming operation by the image forming unit 33 upon causing the display unit 410 to successively display the respective reception screens 4105 for the respective settings of the function indicated by a workflow corresponding to the depressed one of the workflow images 4101*a* to 4104*f*. Further, the display controller 511 causes display to the effect that a set value for the sheet storage location is already set to the manual feed tray 220 on the sheet storage location reception screen (e.g. "SPECIFIED VALUE: MANUAL" on the sheet storage location reception screen shown in FIG. 6B).

When the setting on the sheet storage location reception screen is completed, the display controller 511 then causes a sheet type reception screen used to enter a set value for sheet type (normal paper, thick paper, postcard, etc.) to be displayed. When the setting on the sheet type reception screen is completed, the display controller 511 causes the reception screen 4105 relating to the selected workflow to be displayed in the wizard format.

It is, for example, assumed that the respective reception screens for the respective settings of the function indicated by the selected workflow are reception screens 1 to 5 and neither the sheet storage locating reception screen nor the sheet type reception screen is included in these reception screens 1 to 5 as shown in FIG. 6A.

In this case, if the manual feed tray detector 514 judges that the manual feed tray 220 is set to the feeding position before any one of the workflow images 4101*a* to 4101*f* displayed on the workflow screen 4101 is pressed by the user, the display controller 511 first causes the display unit 410 to display the sheet storage locating reception screen and then the sheet type reception screen before displaying the reception screens 1 to 5 and, subsequently, display the reception screens 1 to 5 (see FIG. 6B).

If any two of the reception screens 1 to 5 are the sheet storage locating reception screen and the sheet type reception screen, the display controller 511 causes the sheet storage locating reception screen and the sheet type reception screen to be successively displayed and then causes the remaining ones of the reception screens 1 to 5 to be displayed.

On the other hand, if the manual feed tray detector 514 judges that the manual feed tray 220 is set to the feeding position while one of a plurality of reception screens 4105 relating to the workflow indicated by the selected one of the workflow images 4101a to 4101f displayed on the workflow screen 4101 is displayed, the display controller 511 temporarily closes the presently displayed reception screen 4105 and causes the sheet storage location reception screen to be displayed. Further, the display controller 511 indicates that the set value for the sheet storage location is already set to the manual feed tray on the sheet storage location reception screen.

When the setting on the sheet storage location reception screen is completed, the display controller 511 subsequently causes the sheet type reception screen used to enter the set value for sheet type (normal paper, thick paper, postcard, etc.) to be displayed. When the setting on the sheet type reception screen is completed, the display controller 511 causes the temporarily closed reception screen and then the remaining reception screens to be displayed in the wizard format.

It is, for example, assumed that the respective reception screens for the respective settings of the function indicated by the selected workflow are reception screens 1 to 5 and neither the sheet storage locating reception screen nor the sheet type reception screen is included in these reception screens 1 to 5 as shown in FIG. 7.

In this case, if the manual feed tray detector 514 judges that the manual feed tray 220 is set to the feeding position during the display of the reception screen 3 relating to the workflow indicated by the selected one of the workflow images 4101a to 4101f displayed on the workflow screen 4101 out of the reception screens 1 to 5, the display controller 511 quickly temporarily closes the presently displayed reception screen 3, causes the sheet storage location reception screen and then the sheet type reception screen to be displayed and, thereafter, cause the reception screen 3 to be displayed again.

Generally, when a user sets a sheet on a manual feed tray in an image forming apparatus including the manual feed tray, the use of a sheet of a different size or a sheet of a different type from those set in a sheet cassette in advance is thought to be intended. Conventionally, in view of user convenience, when the user sets a sheet on the manual feed tray and attaches the manual feed tray to an apparatus main body, setting relating to a storage location of the sheet to be fed for an image forming operation out of a workflow is automatically switched. However, the user could not know that this setting had been automatically switched.

Thus, the user had to perform an extra operation of confirming the content of the setting. However, according to this embodiment, when either setting of the manual feed tray 220 in a state capable of feeding a sheet or setting of a sheet on the manual feed tray 220 is detected by the manual feed tray detector 514, the display controller 511 causes the display unit 410 to display the sheet storage location reception screen used to enter the set value for the storage location of the sheet to be fed for the image forming operation by the image forming unit 33 in an interrupting manner between the respective reception screens to be displayed in the wizard format. This enables the user to confirm the storage location of the sheet to be fed for the image forming operation by the image forming unit 33 without imposing the user to perform the operation of causing the sheet storage location reception screen to be displayed.

Further, since it is indicated on the sheet storage location reception screen that the set value for the sheet storage location is already set to the manual feed tray 220, time and effort required for the user to enter the set value for the storage location of the sheet to be fed for the image forming operation by the image forming unit 33 can be saved.

In this embodiment, if the manual feed tray 220 is set to the feeding position before the respective reception screens 4105 are displayed in the wizard format, the display controller 511 causes the sheet storage location reception screen to be first displayed upon displaying the respective reception screens 4105 in the wizard format. Thus, without being imposed to perform the operation of causing the sheet storage location reception screen to be displayed, the user can confirm the storage location of the sheet to be fed for the image forming operation by the image forming unit 33 by paying more attention as compared with a mode for causing the sheet storage location reception screen to be displayed while the respective reception screen 4105 are displayed in the wizard format.

If the manual feed tray 220 is set to the feeding position while the reception screen 4105 relating to the workflow is displayed, the display controller 511 quickly temporarily closes the presently displayed reception screen 4105 and causes the sheet storage location reception screen to be displayed. Thus, without being imposed to cause the sheet storage location reception screen to be displayed, the user can confirm the storage location of the sheet to be fed for the image forming operation by the image forming unit 33 by paying more attention as compared with a mode for causing the sheet storage location reception screen to be displayed after input on the presently displayed reception screen is completed.

By causing the sheet type reception screen relating to the sheet storage location reception screen to be displayed after the sheet storage location reception screen, the display controller 511 can allow the user to enter the sheet type before the user forgets about the type of the sheet set on the manual feed tray 220.

The present invention is not limited to the construction of the above embodiment and various modifications can be made. The construction and processes shown in FIGS. 1 to 7 are merely an exemplary embodiment according to the present invention and not of the nature to limit the present invention to the above embodiment.

For example, in the above embodiment, the manual feed tray detector 514 detects whether or not the manual feed tray 220 is set at the feeding position based on an output signal of the manual feed tray sensor 76, and the display controller 511 causes the display unit 410 to first display the sheet storage location reception screen used to enter the set value for the storage location of a sheet to be fed for the image forming operation by the image forming unit 33 upon causing the display unit 410 to successively display the respective reception screens 4105 for the respective settings of the function indicated by the workflow corresponding to the pressed one of the workflow images 4101a to 4104f when the manual feed tray detector 514 judges that the manual feed tray 220 is set to the feeding position before any one of the workflow images 4101a to 4101f displayed on the workflow screen 4101 is pressed. However, without being limited to such a mode, a construction for detecting whether or not a sheet has been set on the manual feed tray 220 (sheet sensor or sheet detector) may be provided, and the display controller 511 may cause the display unit 410 to first display the sheet storage location reception screen when the it is detected that a sheet has been set on the manual feed tray 220 before any one of the workflow images 4101a to 4101f displayed on the workflow screen 4104 is pressed by the user.

This application is based on Japanese Patent application serial No. 2010-022883 filed in Japan Patent Office on Feb. 4, 2010, the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. An operating device, comprising:
    a display unit;
    a storage for storing a workflow to display a plurality of reception screens in a predetermined display order, the reception screens enabling values to be set for a plurality of processing items in an imaqe forming apparatus that includes the operating device;
    a detector that detects either whether or not a manual feed tray capable of selectively storing sheets of a plurality of sizes, which can be fed to an image forming unit that forms an image on a sheet, has been set in a state capable of feeding a sheet or whether or not a sheet has been set on the manual feed tray; and
    a display controller that reads the workflow from the storage and causes the display unit to display the plurality of reception screens in a wizard format and in the predetermined display order;
    wherein the display controller
    closes the reception screen of the workflow that currently is displayed if the detector detects that the manual feed tray has been set in the state capable of feeding a sheet or if the detector detects that a sheet has been set on the manual feed tray,
    causes the display unit to display a sheet storage location reception screen used to enter a set value for a storage location of a sheet to be fed for an image forming operation by the image forming unit in an interrupting manner effect that the set value for the sheet storage location is already set to the manual feed tray on the sheet storage location reception screen, and then
    causes the display unit to display the reception screen that had been closed and then to display following reception screens of the workflow.

2. An operating device according to claim 1, wherein:
    the display controller performs a process of a display order of the sheet storage location reception screen as an order of causing the sheet storage location reception screen to be first displayed before displaying the respective reception screens of the workflow as an interrupt when the respective reception screens are displayed in the wizard format in the case of detecting by the detector either that the manual feed tray has been in the state capable of feeding a sheet or that a sheet has been set on the manual feed tray before the respective reception screens are displayed in the wizard format on the display unit.

3. An operating device according to claim 1, wherein:
    the display controller causes the display unit to display a sheet type reception screen used to enter a set value for sheet type together with the sheet storage location reception screen, and the sheet type reception screen is displayed after the sheet storage location reception screen.

4. An image forming apparatus, comprising:
    an image forming unit that forms an image on a sheet;
    a sheet storage unit including one or more sheet cassettes that stores predetermined sheets and the manual feed tray; and
    an operating device according to claim 1.

* * * * *